United States Patent Office 3,418,812
Patented Dec. 31, 1968

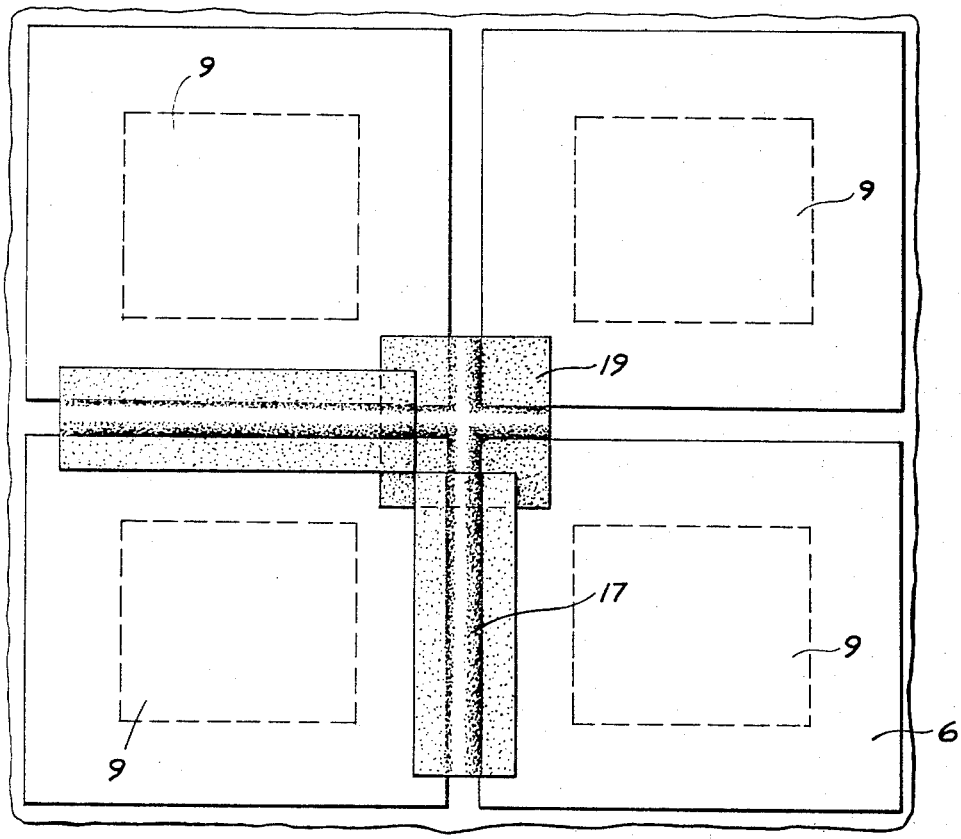
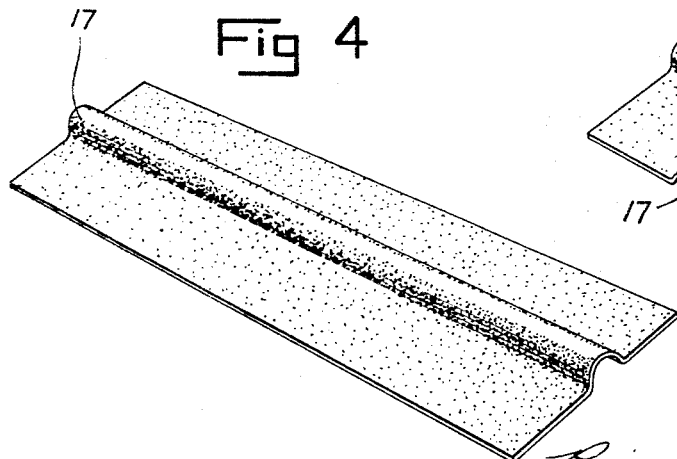
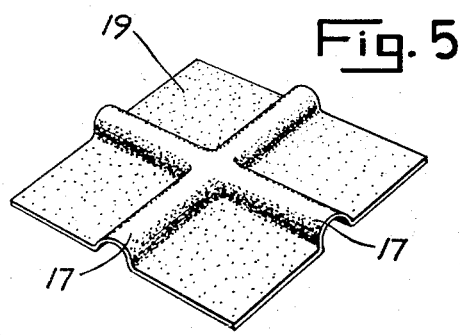

3,418,812
INSULATING MEANS FOR UNDERGROUND
STORAGE SYSTEM
Amanullah R. Khan, Chicago, Bertram E. Eakin, Naperville, and Phillip J. Anderson, Deerfield, Ill., assignors to Institute of Gas Technology, a not-for-profit corporation of Illinois
Filed Feb. 14, 1966, Ser. No. 526,983
10 Claims. (Cl. 61—.5)

ABSTRACT OF THE DISCLOSURE

An insulation system for an underground rock cavern for storing liquified gases at cryogenic temperatures. A first vapor and liquid impervious sealant is contiguous with the surface of the rock cavern. A first layer of thermal insulation is contiguous with the first sealant. A second layer of thermal insulating panels is secured to the first layer of thermal insulation. A second liquid and vapor impervious sealant is contiguous with and secured to the innermost surface of the insulating panels to prevent the passage of liquid or vapor from or into the cavern.

---

This invention relates to means for insulating an underground storage cavern to be used for storing liquefied gases at substantially atmospheric pressure. In particular, the invention relates to a composite insulation structure useful for insulation at cryogenic temperatures wherein there is provided insulation means which will expand and contract under thermal stresses without cracking or rupturing, and vapor and liquid sealing means which prevents loss of stored gas or liquid from the cavern and entry of liquid water or water vapor from outside into the cavern.

There is described in our copending application Ser. No. 527,158 filed Feb. 14, 1966 a new and improved method for storing large volumes of liquefied gases underground at substantially atmospheric pressure in a safe and economical manner. The invention described in the aforementioned application relates generally to the storage of liquefied gases in rock caverns or rock structures such as quarried excavations near the ground surface, the caverns being insulated and lined to provide low evaporation rates and safe containment of the low temperature liquefied gases at substantially atmospheric pressure. The caverns are designed to store liquefied natural gas and may also be used for storage of other gases which have been cooled to the liquid state at atmospheric pressures such as ethane, propane, and butane as well as ammonia, carbon dioxide, argon, nitrogen and hydrogen.

The underground rock storage caverns with which the insulation system of this invention are particularly useful comprise room and pillar caverns which have been excavated by means of a large inclined entry to permit rapid ingress and egress of heavy equipment for efficient and economical excavation. The walls, roof and pillars of the cavern are coated with a moisture or water sealant as hereinafter described and all rock surfaces are insulated with one or more layers of thermal insulating material, preferably foam material, providing internal insulation in the cavern. Such insulation system is the subject of this invention. The portion of inclined entry to be insulated is provided with a double bulkhead system which prohibits gas or liquid leakage from the cavern. The bulkhead system comprises a liquid bulkhead which serves as a weir as described in copending application Ser. No. 527,288 filed Feb. 14, 1966 and a vapor barrier through which suitable apertures are provided for piping means for filling, emptying, relieving and instrumenting the rock cavern. Such vapor barrier is described in copending application Ser. No. 527,288 filed Feb. 14, 1966.

By way of background, storage of liquefied gases in the past has been at either atmospheric pressure or superatmospheric pressure. When stored at atmospheric pressure, the gas must be liquefied and maintained in storage in liquid form which in the case of liquefied natural gas means maintenance at about −258° F. Insulation is required to reduce the heat influx to the boiling liquid in order to reduce the cost of the reliquefaction plant facility. The present practice is to store liquefied gases in aboveground metal or concrete containers and in belowground or partially belowground concrete containers. These containers are insulated to conform to the permissible rate of evaporation.

Storage in such containers presents difficulties. In the case of aboveground insulated containers which store large quantities of highly volatile combustible liquid, a large area of uninhabited ground and suitable diking must surround it for reasons of safety. Also, another limitation of aboveground storage containers is the size limitation restricting capacity to 300,000 barrels. Multiple installations are therefore required for large volume storage (3,000,000 barrels).

When belowground or partially belowground concrete containers are employed the same restriction on maximum capacity exists. In either case, the gases in liquid and vapor state are not completely confined belowground at any substantial depth. Systems of the above description are shown in U.S. Patent Nos. 3,151,416 and 3,196,622.

Liquefied gases have heretofore been stored completely belowground in rock caverns at superatmospheric pressures and relatively higher temperatures as described in U.S. Patent Nos. 3,058,316 and 3,205,665. The high pressure necessitates location of the cavern at a depth sufficient for the overburden pressure to balance or overcome the liquid storage pressure. In addition, maintenance of the pressure presents problems and requires a small diameter vertical shaft. Storage volume is lost when storing gases at relatively high temperatures and pressures due to the decreased density of the liquid. The high pressure techniques utilize an ice matrix to create impermeability of the rock mass to the liquid or vaporized gas. Under certain conditions of pressure and temperature, undesirable formation of hydrocarbon hydrates can occur resulting in loss of stored product. Thermocycling or warm-up of the cavern is difficult since melting of the ice matrix may result in loss of compactness and impermeability of the system. These types of high pressure storage systems also are uninsulated because no economical method of insulating was available heretofore. Consequently, these systems experience high rates of gas vaporization due to high heat influx rates from the bare rock to the low temperature liquefied gas.

For such cavern to be insulated, the density of insulation used must be high enough to withstand the internal pressure. This results in markedly reducing the insulating character of the material used and requires a greater insulation thickness. Thus the increased depth, pressure and insulation (if any of these are employed) are costly and such storage systems are uneconomical.

It is therefore an object of this invention to provide a novel insulation system for an underground rock cavern for storage of liquefied gases at atmospheric pressure which system reduces the rate of heat transfer from outside the cavern into the cavern and further prevents liquid or vapor transfer into or out of the cavern.

It is another object of this invention to provide an underground rock cavern insulation system which can be subjected to cryogenic temperatures without cracking or rupturing under thermal stresses.

It is yet another object of this invention to provide an insulation system for an underground rock cavern which is economical to construct and which is simple to maintain.

It is yet another object of this invention to provide an insulation system for an underground storage cavern which system is free to expand and contract under thermal stresses but which provides sufficient rigidity to support the hydrostatic pressures of the liquid being stored without being crushed or deformed.

Other objects of the invention will become obvious as the invention is described more fully hereinafter.

The foregoing objects are accomplished by the present invention which generally comprises a first vapor and liquid impervious sealant, which is contiguous with the surface of underground rock cavern for storing liquified gases at cryogenic temperatures, a layer of thermal insulation contiguous with the first sealant, a layer of thermal insulation secured to the first layer of insulation, and second liquid and vapor impervious sealant-means which is contiguous with and secured to the innermost surface of the second layer of insulating panels to prevent the passage of liquid or vapor from or into the cavern.

In the drawings:

FIG. 3 is an enlarged side view showing the means by which the insulating panels of the invention are secured together within the rock cavern;

FIG. 4 is a perspective view showing one form of sealing tape used to seal the panels of the invention; and FIG. 5 is a perspective view showing another embodiment of the sealing tape for sealing the panels.

Figure 1:
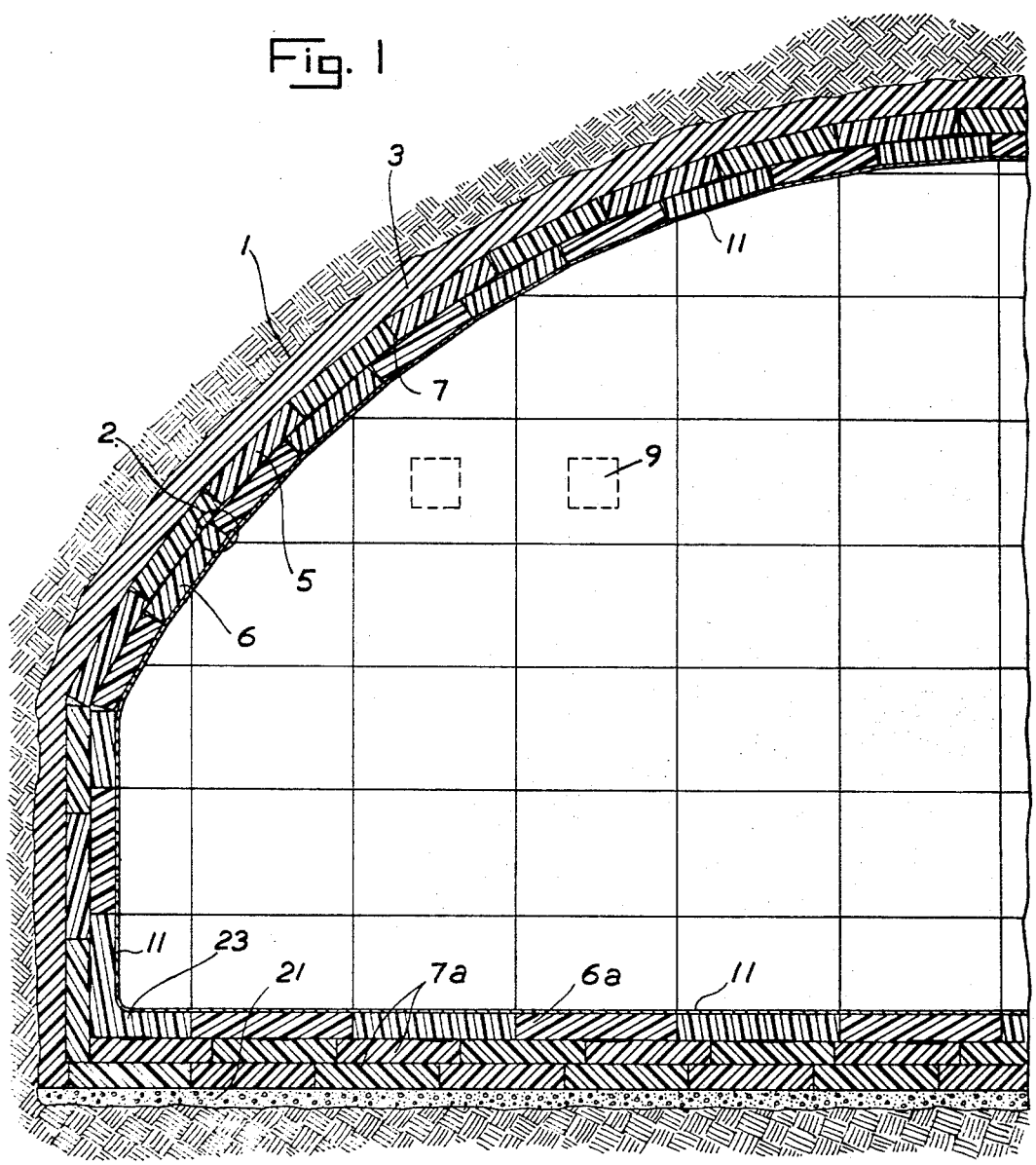
FIG. 1 is a partial side view in section showing the insulation means and lining means of the invention as it appears in a completed rock storage cavern.

Referring to FIG. 1, the insulation system of this invention which is suitable for use on the irregularly shaped walls and ceiling of a rock cavern consists first of a layer of water and moisture sealant 1 which preferably is sprayed onto the internal surface of the cavern after it has been excavated, cleaned and dried. One or more coatings may be used and any conventional material available commercially for sealing purposes may be employed, e.g., silicone base or thorium base sealant materials. Since many organic insulations are seriously attacked by moisture, generally causing softening of the materials and increased thermal conductivity through the effected portions of material, the cavern should be substantially dry before applying the sealant material. Any major water influx encountered during the construction is sealed off by use of standard techniques such as pneumatic grouting with nonshrinking or expanding type mortars or chemical grouts prior to spraying on the sealant.

The first insulation layer is preferably a foamed-in-place insulation 3. Since general mining techniques tend to leave an irregularly shaped wall surface, the foam-in-place technique is desirable since it permits formation of insulation against irregular surfaces. To support and enclose the foaming operation, it is necessary to construct a series of smooth-connected surfaces at some preselected average distance from the irregular rock surfaces by use of standard scaffolding techniques similar to those used in placing forms for the pouring of concrete walls. However, since the outward pressures generated by foamed-in-place insulation are much lower than that generated by the hydrostatic action of poured concrete, the load on these forms is lower and they may be of much lighter construction. Also, only one surface need be formed since the rock surface is itself the exterior form.

If suitable insulation material is available which can be foamed in place for the entire thickness of the insulation in a single application, this is the preferred manner of construction.

However, if multiple layer insulation is desired, foam-type organic insulation panels can be used. It is most economical to prepare standard panels of uniform size and thickness and then utilize multiple layers of such panels. This type of construction is also desirable due to the high coefficient of thermal contraction of presently known organic type foam insulations.

When a multiple layer insulation system is utilized, the precast panels are used as the form for restraining the foaming of the foamed-in-place insulation, i.e., the panels serve the dual purpose of forms plus a second layer of thermal insulation. Such panels are shown at 5 in FIG. 1. In this manner the first two layers of insulation are installed in a single operation. If polyurethane material is used as the poured-in-place material, a strong bond is formed between the poured-in-place insulation and the rock and also between the poured-in-place insulation and panels 5.

The edges of panels 5 are "buttered" with a non-setting mastic compound 7 (FIG. 1) which helps to seal and prevent gas and liquid movement through the insulation. The same mastic is used on the edges and back of each new layer of panels as they are installed except for the innermost layer of insulation.

Any number of layers of panels may be installed depending upon the temperature requirements and the foam material being used. As shown in FIG. 1, one additional layer of foam blocks 6 is used and is secured to the first block panel by means of adhesive which is spread at the center of the back of each panel which is already in place, as shown at 9 in FIGS. 1 and 3.

The innermost layer of insulation panel which is block 6 in the embodiment of FIG. 1, carries a flexible or non-rigid liquid and gas barrier or liner 11 as an integral part of the panel. A suitable material for this barrier or liner is Mylar (polyethylene terephthalate film) film or aluminium or other metal foil coated with Mylar, preferably a Mylar—aluminum-Mylar laminate with a backing of light-weight fiber cloth for increased tear resistance. Such a material is impermeable to gas or liquid, even at cryogenic temperatures, and suitable adhesives and application methods are available to make tape-type joints which are also essentially impermeable. Mylar is identified on page 746 of the publication, The Condensed Chemical Dictionary, fifth edition, published in 1956 by Reinhold Publishing Corp., New York, and Chapman and Hall Ltd., London, England. Care must be exercised in handling the laminate to prevent creasing the material, as this tends to form pin holes which will cause leakage. It is also essential to form a good seal and that the liner be on a smooth and firm backing. This condition is adequately met when the liner is installed during the manufacturing process as an integral part of the panel.

Figure 2:
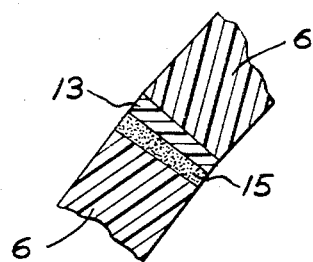
FIG. 2 is an enlarged view of a portion of FIG. 1.

The insulation panels for the innermost layer of insulation are provided on their edges with a relatively thin layer of open cell foam 13 (FIG. 2) commonly referred to as flexible foam. These panels are then installed by using a suitable cryogenic adhesive, such as urethane adhesive, on approximately one quarter of the back surface in the center of each panel as shown at 9 in FIG. 1 and continuously along all four edges of the flexible foam, as shown at 15 in FIG. 2. In this manner each panel is restrained in place only at its center, and the edges are free to move due to thermal contraction as the cavern is cooled. The flexible foam provides the same function for this exterior layer as the non-setting mastic provides for the central layers, i.e., keeping the edges between panels filled as the panels contract or expand with changes in cavern temperature. However, the open cell structure, and the fact that only a fraction of the space between the exterior and central layer are filled with adhesive, provides a path for any gas leaking through pin holes in the liner or the tape seal to flow to the ceiling of the cavern. Here the gas can be removed through the gas exhaust line described in copending application Ser. No. 527,158 filed Feb. 14, 1966 or can flow through an opening in the liner and enter directly into the gas space above the liquid in the cavern. Both methods prevent any build-up of pressure between the liner and insulation due to either liquid or gas leakage which might tend to cause a major failure of the liner.

After installation of the innermost layer of insulation, the joints between panels are sealed with a wide tape of material similar to the liner by a suiable cryogenic adhesive. The sealing technique is best shown in FIG. 3. The form of tape used along the edges of the panels is shown in FIG. 4 and has a creased portion 17 provided to compensate for displacement of the panels due to thermal stresses. At the corners a preformed corner patch 19 as shown in FIG. 5, is provided with creased portions running in both horizontal and vertical directions to provide for normal expansion and contraction of the panels at the corners.

The floor insulation differs from that used on the walls and the ceiling in several details. The floor is finished with a slight grade from edges to center of each room of the cavern to drain to a liquid sump. To provide a smooth surface for installation of insulation, the floor is covered with a thin layer of concrete 21 and is then sealed with the same water sealant as used on the rock walls. All floor thermal insulation is in panel form as shown at 7a and 6a with all layers except the innermost layer joined with the non-setting mastic on the back and edges of each panel as before. The innermost layer 6a also carries the vapor and liquid impermeable liner as an integral part of the liner and is installed as on the wall. Joints are secured by the cryogenic-tape as above described with reference to the walls and ceiling.

At the edges between the walls and the floors, a special precast insulation panel is used with the liner as an integral part of it. Such a special precast panel, shown at 23 in FIG. 1, provides a smooth transition from the horizontal to the vertical plane. The corner precast panel may be in whatever form is required depending upon the relationship between the horizontal and vertical portion into which the panel is to be inserted. The floor liner and the wall liner are sealed to the edge pieces 23 with the same tape seal as used on the wall and floor panels.

The use of machine-made standard size insulation panels provides a distinct economy. Suitable panels can be commercially prepared such that a kraft paper-Mylar laminate on each surface is an integral part of the manufacturing process as described in copending application Ser. No. 527,158, filed Feb. 14, 1966. These covered panels are susceptible to damage in shipping and installation and should be protected from moisture from manufacture to installation. The liners provide additional protection from damage due to possible water seepage through the rock wall sealants over the lifetime of the cavern.

It should be clear from the above description of our invention that the insulation system described provides a simple and economical method for insulating the interior surface of a rock cavern for the storage of liquid at cryogenic temperatures. Although we prefer to use polyurethane foam as the foam-in-place material and also as the panel material, it should be clear to those skilled in the art that any other insulating material which can be made in the form of panels which is sufficiently rigid to withstand the hydrostatic pressures of the stored liquid could be used. It should also be clear that the vapor and liquid impervious liner which is provided on the internal surface of the insulation could be a sprayed material rather than laminate material which will provide the same function of sealing liquid and vapor passage from the cavern to the insulation. Those skilled in the art will recognize that various other modifications can be made to our insulation system within the scope and spirit of the invention which we intend to be limited solely by the following claims:

We claim:
1. An insulation system for an underground rock cavern for the storage of liquified gases, at cryogenic temperatures, said system comprising a first vapor and liquid impervious sealant-means contiguous with the surface of said rock, a first layer of thermal insulation contiguous with said first sealant-means, a second layer of thermal insulating panels secured to said first layer of thermal insulation, and second non-rigid liquid and vapor impervious sealant-means contiguous with and secured to the innermost surface of said second layer of insulating panels to prevent the passage of liquid vapor from or into said cavern.

2. Insulation system of claim 1 wherein the floor of said cavern is covered with a layer of concrete.

3. Insulation system of claim 2 wherein said first sealant-means is contiguous with said concrete.

4. Insulation system for an underground rock cavern for storage of liquefied gases at cryogenic temperatures comprising a first vapor and liquid impervious sealant-means contiguous with the surface of said rock, a layer of foamed-in-place insulation contiguous with said first sealant-means, a layer of thermal insulating panels secured to said foamed-in-place insulation, and second liquid and vapor impervious sealant-means contiguous with and secured to the innermost surface of said insulating panels to prevent the passage of liquid or vapor from or into said cavern.

5. Insulation system of claim 4 wherein the edges of said insulating panels are covered with flexible foam to permit contraction and expansion of said panels under thermal stresses without rupturing or cracking.

6. Insulation system of claim 4 wherein said panels are secured together by adhesive and tape suitable for use at cryogenic temperatures.

7. Insulation system of claim 2 wherein said tape is provided with means for expanding and contracting under thermal stresses.

8. Insulation system of claim 4 wherein said panels are rigid polyurethane foam.

9. Insulation system of claim 4 wherein said second liquid and vapor impervious sealant-means is a film of polyethylene terephthalate .

10. Insulation system of claim 4 wherein said second liquid and vapor impervious sealant-means consists of a laminate of polyethylene terephthalate and metal foil with a backing of light weight fiber cloth.

References Cited

UNITED STATES PATENTS

| | | | |
|---|---|---|---|
| 2,961,840 | 11/1960 | Goldtrap | 61—.5 X |
| 3,064,436 | 11/1962 | Loofbourow et al. | 61—.5 |
| 3,109,206 | 11/1963 | Beam | 52—57.3 X |
| 3,151,416 | 10/1964 | Eakin et al. | 61—.5 X |
| 3,159,006 | 12/1964 | Sliepcevich | 61—.5 X |
| 3,196,622 | 7/1965 | Smith et al. | 62—45 |
| 3,224,621 | 12/1965 | Upthegrove. | |
| 3,241,274 | 3/1966 | Proctor et al. | 61—.5 X |

FOREIGN PATENTS 111,569   3/1962   Pakistan.

EARL J. WITMER, *Primary Examiner.*